(12) United States Patent
McKinney et al.

(10) Patent No.: US 12,354,250 B1
(45) Date of Patent: Jul. 8, 2025

(54) AUTOMATED DAMAGE SEVERITY ASSESSMENT SYSTEM AND METHOD

(71) Applicant: RAZE MOTORSPORTS INC., Port Charlotte, FL (US)

(72) Inventors: Christopher R. McKinney, Port Charlotte, FL (US); Robert Crain, Port Charlotte, FL (US)

( * ) Notice: Subject to any disclaimer, the term of this patent is extended or adjusted under 35 U.S.C. 154(b) by 0 days.

(21) Appl. No.: 16/908,110

(22) Filed: Jun. 22, 2020

Related U.S. Application Data

(60) Provisional application No. 62/864,343, filed on Jun. 20, 2019.

(51) Int. Cl.
*G06T 7/00* (2017.01)
*G06Q 50/163* (2024.01)
*G06T 17/10* (2006.01)

(52) U.S. Cl.
CPC ............ *G06T 7/0002* (2013.01); *G06T 17/10* (2013.01); *G06Q 50/163* (2013.01); *G06T 2207/10028* (2013.01)

(58) Field of Classification Search
CPC .................. G06T 7/0002; G06T 17/10; G06T 2207/10028; G06Q 50/163
See application file for complete search history.

(56) References Cited

U.S. PATENT DOCUMENTS

| | | | |
|---|---|---|---|
| 8,346,578 B1 | 1/2013 | Hopkins, III et al. | |
| 8,756,085 B1 | 6/2014 | Plummer et al. | |
| 8,775,219 B2 | 7/2014 | Swanson et al. | |
| 9,158,869 B2 | 10/2015 | Labrie et al. | |
| 9,805,261 B1 | 10/2017 | Loveland et al. | |
| 9,823,658 B1 | 11/2017 | Loveland et al. | |
| 9,846,915 B2 | 12/2017 | Howe et al. | |
| 10,354,386 B1 * | 7/2019 | Farnsworth | G06T 7/0085 |
| 10,635,903 B1 * | 4/2020 | Harvey | G06T 7/0002 |
| 2006/0018519 A1 * | 1/2006 | Siegel | G06K 9/00013 |
| | | | 382/116 |
| 2008/0151262 A1 * | 6/2008 | Tanaka | H01L 21/02675 |
| | | | 356/601 |
| 2009/0265193 A1 | 10/2009 | Collins et al. | |
| 2012/0243774 A1 * | 9/2012 | Chen | G06T 17/005 |
| | | | 382/154 |
| 2013/0218531 A1 * | 8/2013 | Deichmann | A61C 5/77 |
| | | | 703/1 |
| 2013/0262029 A1 | 10/2013 | Pershing | |
| 2015/0302529 A1 * | 10/2015 | Jagannathan | G06Q 40/08 |
| | | | 705/4 |
| 2015/0348204 A1 | 12/2015 | Daues | |

(Continued)

OTHER PUBLICATIONS

U.S. Appl. No. 62/743,763 (Year: 2018).*

(Continued)

*Primary Examiner* — Sing-Wai Wu
(74) *Attorney, Agent, or Firm* — John Rizvi; John Rizvi, P.A.—The Patent Professor®

(57) ABSTRACT

An automated damage severity assessment system and method is disclosed. The present system scans and assesses roof damage, and generates a damage severity report without the oversight of a roof inspector. The system comprises a central database of reference images and data that is constantly reviewed and updated to ensure accuracy of the reports, and aims to reduce the errors and waste inherent in the current methods.

20 Claims, 10 Drawing Sheets

(56) References Cited

U.S. PATENT DOCUMENTS

| | | | |
|---|---|---|---|
| 2017/0352099 A1 | 12/2017 | Howe et al. | |
| 2017/0352100 A1 | 12/2017 | Shreve et al. | |
| 2017/0352104 A1 | 12/2017 | Hanson et al. | |
| 2018/0053347 A1* | 2/2018 | Fathi | G06T 17/05 |
| 2019/0026400 A1* | 1/2019 | Fuscoe | G06T 17/05 |
| 2020/0103552 A1* | 4/2020 | Phelan | G01S 13/95 |

OTHER PUBLICATIONS

Fusion of Infrared Thermal Image and Visible Image for 3D Thermal Model Reconstruction Using Smartphone Sensors (Year: 2018).*

"Identifying Deliberate Hail and Wind Damage" found at http://rci-online.org/wpcontent/uploads/2013-12-hogan.pdf discloses methods for assessing roof damage.

* cited by examiner

AUTOMATED DAMAGE SEVERITY ASSESSMENT SYSTEM AND METHOD

CROSS-REFERENCE TO RELATED APPLICATIONS

This application claims the benefit of U.S. Provisional Patent Application Ser. No. 62/864,343, filed Jun. 20, 2019, which is incorporated herein in its entirety.

FIELD OF THE INVENTION

The present invention relates generally to scanning devices, and more particularly, to an automated damage severity assessment system and method.

BACKGROUND OF THE INVENTION

Roof shingles are a roof covering consisting of individual overlapping elements that are typically flat, rectangular shapes laid in courses from the bottom edge of the roof up. Such shingles are typically made from various materials such as wood, slate, flagstone, metal, plastic, and composites, and tend to have a life expectancy of 20 to 60 years. One common cause of shortened roof shingle life span is damage as a result of heavy weather. Storms and hail can attack roof shingles with solid objects travelling at very high speeds that can cause blunt- and sharp-force damage to the individual tiles. Often such damage cannot be visualized from ground level, and special techniques are generally involved in the damage assessment process.

Essential to such processes, though, is having a person or device access the top of the roof for direct visualization of the tiles themselves. An inspector, for example, may mark out one or more 10 foot by 10 foot areas on the roof for closer inspection, and may then determine the number of damaged spots within each area. A threshold of 6 to 10 damaged spots in an area is considered a roofing industry standard determination for the need to repair or replace the roof shingles on the entire roof.

A partial or complete roof replacement can become very expensive, and insurance policies exist to cover homeowner's for such a loss. The insurance industry pays almost $11 billion per year for asphalt shingle roof replacement, which, by some estimates, may include up to 70% of roofs that did not actually require replacement. The justification for such replacement comes via a human assessment of the damage to the roof shingles themselves, and such assessments may be subject to fraud and to error. The inspector, for example, may over-emphasize the damage to a roof to falsely justify its need for replacement, or a reviewer may misinterpret pictures of the damage to inaccurately exacerbate the severity of roof damage. While damage assessment standardization has been put in place in the industry, the application of a human element to the process opens the system up to significant errors and to waste that result in increased costs for insurance companies and for homeowners.

Therefore, there is a need in the art for an automated damage severity assessment system and method that may computerize and automate the damage assessment process and reduce or eliminate errors and waste caused by the human element of the modern system.

SUMMARY OF THE INVENTION

This summary is provided to introduce a selection of concepts in a simplified form that are further described below in the detailed description. This summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

According to embodiments or examples of the present disclosure, an automated damage severity assessment system and method is disclosed.

In one aspect, the assessment system and method may comprise a proprietary hardware arrangement.

In another aspect, the assessment system and method may comprise a proprietary software.

In another aspect, the assessment system and method may comprise a plurality of scanning devices.

In another aspect, the assessment system and method may comprise a central database.

In another aspect, the assessment system and method may comprise a plurality of prior roof scans.

In another aspect, the assessment system and method may comprise a scan comparison software.

In another aspect, the assessment system and method may comprise an assessment calculating software.

In another aspect, the assessment system and method may comprise an assessment reporting software.

In another aspect, the assessment system and method may produce a roof damage assessment report.

In another aspect, the assessment system and method may prevent a user from altering the roof damage assessment report.

Furthermore, disclosed is a method of identifying surface damage, comprising
  scanning a target surface to produce a three-dimensional point cloud;
  photographing the target surface to produce a photograph;
  overlaying the point cloud on the photograph or overlaying the photograph on the point cloud to produce a 3D-photo model; and
  identifying a damage type based on the 3D-photo model.

In another aspect, scanning the target surface includes using a light wavelength range, the wavelength range being one that prevents sunlight from interfering with the scan.

In another aspect, photographing the target surface includes using a light wavelength range, the wavelength range being one that produces a color photograph.

In another aspect, identifying a damage type includes comparing metrics of the point cloud to a library of known metrics of known damage types.

In another aspect, identifying a damage type includes automatically comparing metrics of the point cloud to a library of known metrics of known damage types using artificial intelligence.

In another aspect, a cross section of the 3D-photo model is displayed to highlight a dip in the target surface.

In another aspect, identifying a damage type includes measuring a dimension of a dip in the point cloud.

In another aspect, identifying a damage type includes determining if surface damage is hail damage.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the claimed subject matter will hereinafter be described in conjunction with the appended drawings provided to illustrate and not to limit the scope of the claimed subject matter, where like designations denote like elements, and in which:

It is to be understood that like reference numerals refer to like parts throughout the several views of the drawings.

DETAILED DESCRIPTION

Figure 1:
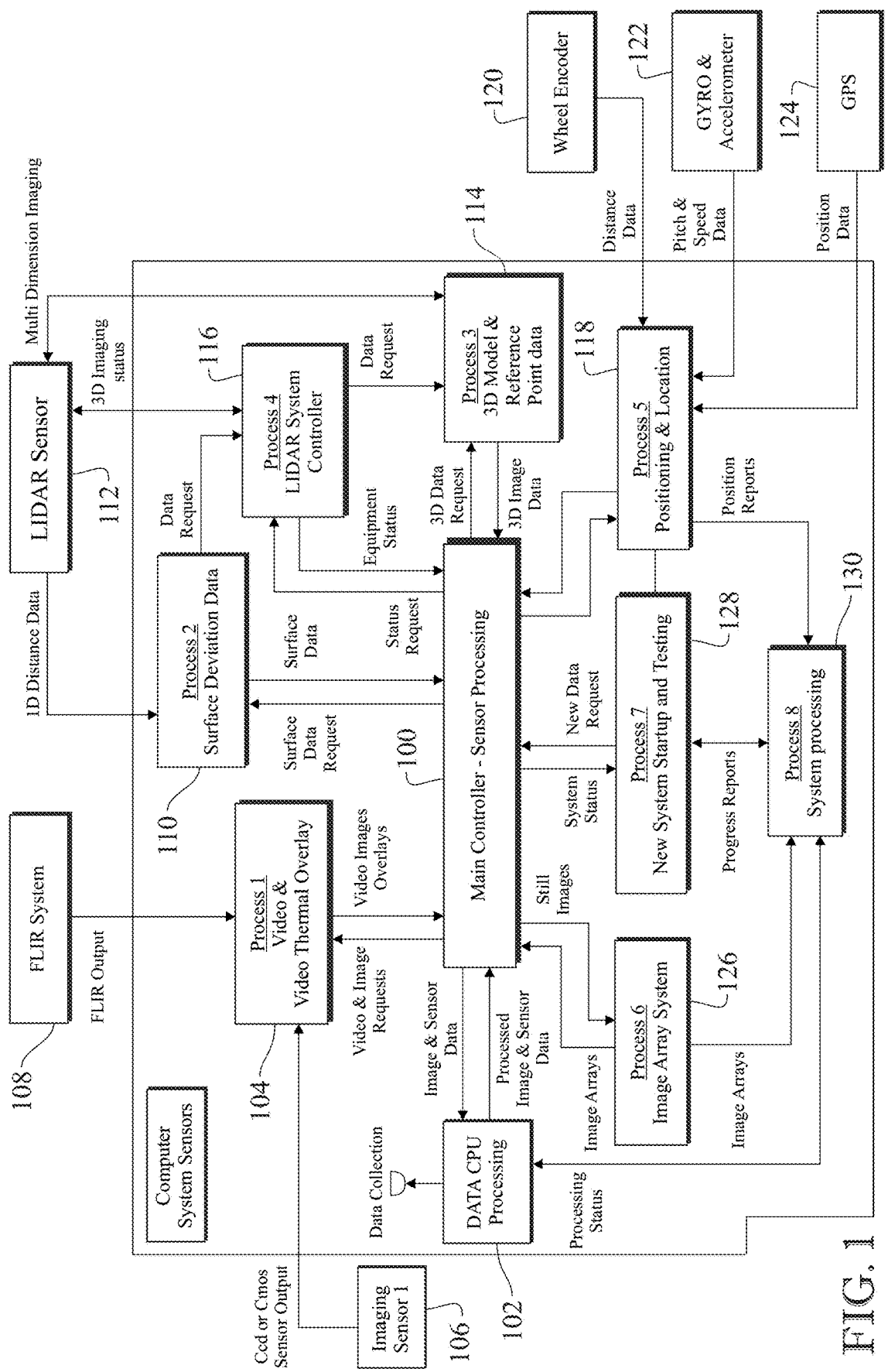
FIG. 1 illustrates a first partial overview of an automated damage severity assessment system and method, in accordance with aspects of the present disclosure.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. Furthermore, there is no intention to be bound by any expressed or implied theory presented in the preceding technical field, background, brief summary, or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

As contemplated by the present disclosure, the following definitions are used herein to clarify and distinguish terms which may be known to those of ordinary skill in the art. A computer system is one that is able to take a set of inputs, process them, and create a set of outputs. This processing is done with a combination of hardware and software. The computer system has one or more inputs to provide data, and this data is then processed in an appropriate manner. The outcome of the processing is sent to an output or it may be stored until required later for an output. For the processing to take place, there may exist a set of instructions for the system to perform. This set of instructions is called a program or an application.

An operating system (OS) is the software that supports the computer system's basic functions, such as scheduling tasks, executing applications, garbage collection, memory allocation, and controlling peripherals. The computer's central processor unit (CPU) handles all of the input/output (I/O) operations, sending the data it receives to the correct path. The path may be to the CPU, graphics processor unit (GPU), to the storage media, or to the random access memory (RAM) for further processing. Such I/O hardware may also be called ports.

The CPU or microprocessor is a component that resides in computers and other electronic devices. Its basic job is to receive input and provide the appropriate output. This processor handles all the system instructions, such as processing sensors and I/O along with running applications. Processors can be 32-bit or 64-bit and include multiple processing cores.

The GPU is specifically designed for rendering graphics or images. GPUs utilize multiple cores and can process data at an extremely fast rate using parallel processing. Complex mathematical calculations are sent to the GPU for processing via compute unified device architecture (CUDA).

CUDA is a parallel computing platform and programming model that enables dramatic increases in computing performance by harnessing the power of the GPU. The GPU provides a massive increase in speed for intense calculations and machine learning, or artificial intelligence (AI) via multiple cores in the GPU.

Storage media is a storage hardware device capable of holding information either written or read by the user or by the computer system. Primary storage devices in computers include RAM and read-only memory (ROM). Secondary storage devices include computer hard drives, solids state drives (SSD), peripheral component interconnect express (PCIe) cards, secure digital (SD) cards, and embedded multi-media cards (eMMC). Secondary storage may be fixed, removable, internal, or external. Other examples of storage media include floppy diskettes, compact disc read-only memory (CD-ROM), compact disc recordable (CD-R), and compact disc rewritable (CD-RW). The system may also implement cloud storage, digital optical disc recordable (DVD-R), digital optical disc rewritable (DVD-RW) jump drives, universal serial bus (USB) drives, flash drives, hard drives, superdisk LS-120, and tape cassettes.

A system management connection may be used to direct the system and enable scanning of roof material along with retrieval of report results. Users input data or instructions into the computer system from this point to be processed. Input could be text, graphic, audio, or video. Input devices are any electronic device connected to a computer and producing input signals. Input devices such as laptops, personal digital assistants (PDA), tablets, cell phones, or desktop personal computers (PC) are used by users to input data or instructions. Data or instructions being input into the computer system would then processed by the CPU, which controls all activities and scheduling within the system. The results of the processed data are then returned to the application as usable data.

A thread is an executed instruction that is running concurrently with other executed instructions. Threads provide multiple instructions the ability to access the CPU, GPU, or storage media at the same time.

Cores, in relation to the CPU, are the processing unit that receives instructions and performs calculations. A processor can contain multiple cores, at least two or more separate cores, with which it can process information at a greater speed.

A process is a step or instruction that the computer system follows to create a result. This result can be stored on a storage device, returned to the CPU or GPU for further processing, or sent to another process as input. A process is the detailed instructions provided by the application and user input the computer system follows. An operating system process is an instance of a computer program that is being executed. It contains the program instruction and its current location in its activity being completed. A process may be made up of multiple threads of the execution process being performed by the CPU or GPU.

Data that is sent to the CPU for processing originating from a process, storage, user input, GPU, or the operating system is known as data CPU processing. Data that is sent to the GPU for processing originating from a process, storage, user input, GPU, or the operating system is known as data GPU processing. The main controller is the primary hardware used to connect all systems, which includes memory, storage, CPU, GPU, and sensors.

Forward looking infrared (FLIR) is a thermal energy detection technology. Laser detection and ranging (LIDAR) is a detection system that works on the principle of radar, but uses light from a laser.

A wheel encoder is a device using circuits, transducers, and software program algorithms for the purposes of speed or distance measurement. A gyroscope can be used to provide stability or maintain a reference direction in navigation systems, automatic pilots, and stabilizers. An accelerometer is an instrument for measuring acceleration. A global position satellite (GPS) system uses satellites to obtain geographical location including altitude. Imaging Sensors may include a camera system using either charge-coupled devices (CCD) or complementary metal-oxides semiconductor (CMOS) technology to convert light waves to signals that can be saved and recalled later. A scanning platform is the physical chassis or frame the scanning system is attached to. A scanning application is the software application or applications running on the scanning hardware also known as embedded hardware.

Figure 2:
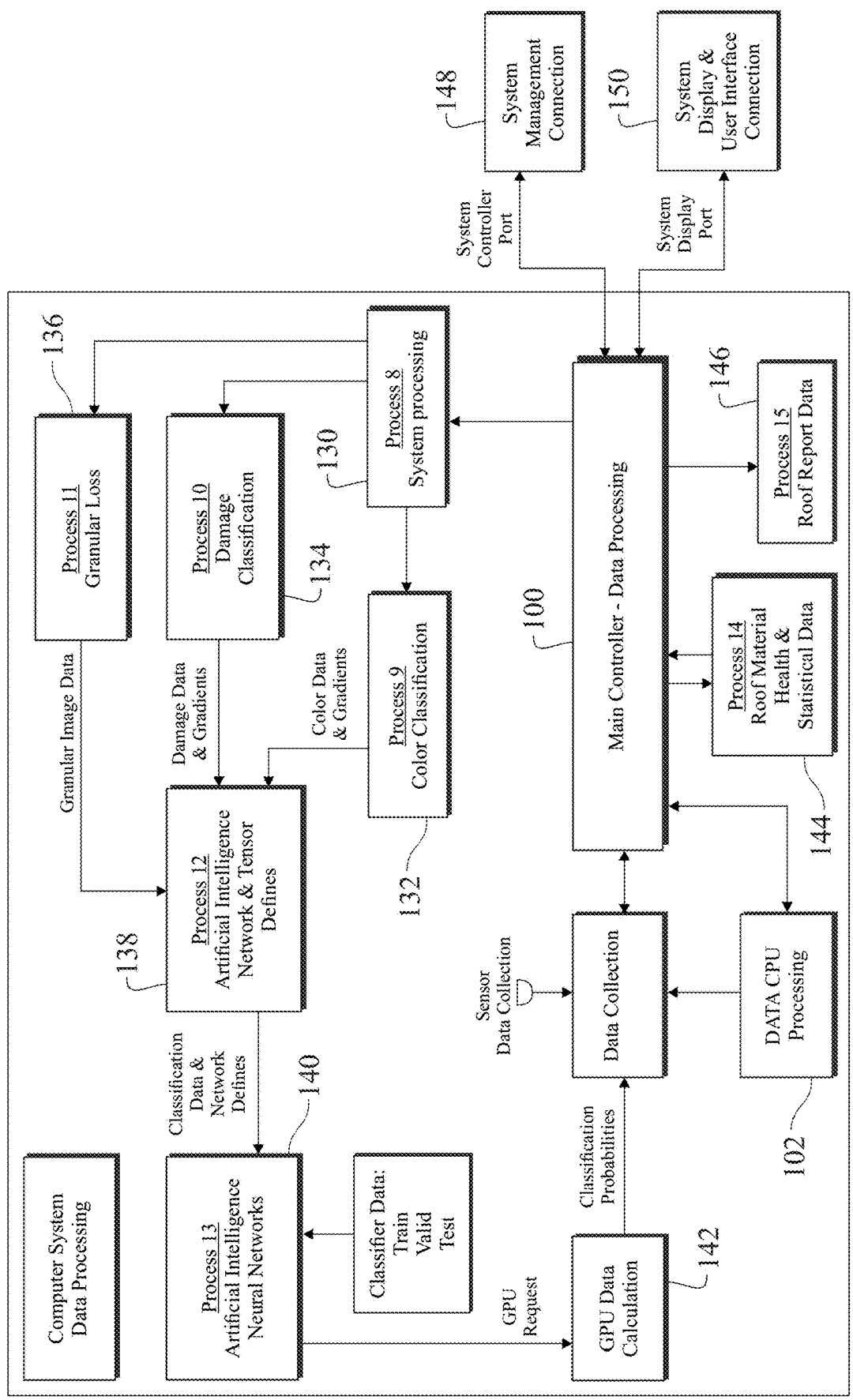
FIG. 2 illustrates a second partial overview of an automated damage severity assessment system and method, in accordance with aspects of the present disclosure.

The illustrations of FIGS. 1 and 2 illustrate an overview of an automated damage severity assessment system and method. The system comprises, generally, a portable device having a built-in software application interfacing with a central database. The portable device may be a scanning tool, and may comprise a plurality of scanning processes for analyzing the physical condition of a surface. The built-in software application may interface with and control the portable device, may process data received from the plurality of scanning processes, and may interface with the central database to create a damage assessment report.

To use the present system a user may begin by engaging the portable device and selecting the desired parameters for the scan to be performed. The user may, via the user interface 150 of the portable device, select the collection area, which may be the industry standard of 10 feet by 10 feet, or which may be any preferred length and width. The user may also begin, pause, resume, or end a scan via the user interface 150, and may interact with the scan in progress by manually entering data into the interface 150 and viewing the live image of the scan. The user may further input secondary data into the system to be associated with the scan, such as customer name and address, task information, business information, and date and time. Via the user interface 150 the user may also review a scan that has been stored in system memory and view reports that have been issued based on the scan. The user may also modify the settings of the portable device itself, and the device may comprise wireless connectivity to allow for hardware and software updates, uploading of scans, and downloading of reports.

Referring now to FIG. 1, the video and video thermal overlay process 104 may involve the receiving of data from a plurality of imaging sensors 106. These sensors 106 may be charge-coupled devices (CCD), complementary metal-oxide semiconductors (CMOS), 3CCD devices, 3MOS devices, or any other appropriate device depending upon user requirements. The plurality of imaging sensors 106 may identify areas of interest or areas to avoid, which may include organic matter or debris. Such areas of interest may be defined by the system as exclusion areas and marked using a technique that surrounds the area with a colored shape, known as a marker, for later image resizing and defect localization. Such areas of interest or exclusion areas are determined based on light reflection techniques, gradient changes in coloring, or Canny edge detection techniques. Edges detected in such a manner are calculated from a previous distance to a known area called a tap, offset, gap, exposure hangover, or keyhole. Edge detection can vary depending on roofing material style. Images and videos collected from the imaging sensors 106 may be classified by the system, also, and each image is tagged with a zone number and location information for later use in the damage assessment report. The portable device may further comprise global positioning systems (GPS) 124, gyroscopes, gyrocompasses, accelerometers 122, and encoders 120 for determining the actual and relative position of the scanned image in relation to the roof area.

A forward looking infrared (FLIR) system 108 may provide additional imagery and data using thermal scans of the roofing material. Such scans may provide a baseline temperature of the roofing material, which can be used to isolate temperature variations in the surrounding materials. Such data can then be used to generate a heat marker overlay on the scanned image, which augments the areas of interest identified in the scan. The image, video, and FLIR scans may be captured concurrently and may be added to the overall data collection. The various images to which the system identified areas of interest may be tagged and queued for closer inspection prior to classification. Images where no areas of interest are identified may be tagged as reference images against which damage may be assessed. All such images may be classified based on various light reflection techniques.

A platform attached to the portable device may act as a sun shield to prevent an area from being heated by the sun. Such an area can become a basis for measurements of heat radiation to further identify areas of damage, mechanical wear, damage from falling objects, thinned areas, thickened areas, and other material faults.

The surface deviation data process 110 may be derived from light distance and ranging (LIDAR) sensors 112 or multidimensional imaging sensors creating a data point cloud to calculate the average depths of the material surface. Zones may be marked out via a grid reference system, and the surface deviation data may be further added to the overall data collection for further classification. Such data may be used to detect the physical edge of the roof or areas where roof material drops or slopes away, and the data can be further implemented to calculate the pitch of the roof. Such surface deviation data may be collected concurrently with other data and may be added to the overall data collection. The LIDAR readings may comprise such details as diameter and depth of identified areas of interest, and such data may be stored for further use by the system.

The three-dimensional (3D) model and reference point data process 114 collects data to provide additional source of imagery and an overall view of the roofing material analyzed. Computer-aided design (CAD) models may be generated from this data to provide additional views and report information garnered through the scan. The data may be collected concurrently with other data and may be added to the overall data collection. Such data may be used to measure the scanning area, identify the roof shingle type or brand, and provide additional measurements for use in the damage assessment report.

The LIDAR system controller process 116 is used to request data from the LIDAR sensor 112, queue manual data retrieval, and provide system status updates regarding the LIDAR equipment 112. The system may implement host-to-sensor and sensor-to-host communications to facilitate such features. The LIDAR system controller 116 can combine its own readings with the points of interest identified, scan direction, and scan range parameters to improve the density and resolution of point cloud data generated. The data may be collected concurrently with other data and may be added to the overall data collection.

The positioning and location process 118 provides positional information to the portable device using the 124, gyroscopes, gyrocompasses, accelerometers 122, and encoders 120 in combination with point of origin data. Modern GPS systems, though, may not provide the accuracy resolution needed for such small area analysis, and such systems may be negatively affected by adverse weather and solar flares. A wheel encoder 120 may be implemented to provide more accurate distance measurements relative to physical movement, and a multi-wheeled encoder system 120 may provide additional accuracy and information when turning around corners. The data may be collected concurrently with other data and may be added to the overall data collection.

The image array system process 126 may serve to modify images taken by the system and remove areas not identified as having an area of interest or other excludable feature. The image array system 126 implements color channels of images encoded as integers between 0 and 255, and may convert these values to floats ranging from 0.0 to 1.0. The image array system 126 may then isolate areas of interest within the remaining images and crop those images to emphasize the area of interest while removing image data that is not to be analyzed. The data may be collected concurrently with other data and may be added to the overall data collection. The image array system process 126 uses image color gradients to determine changes in the physical surface of the image, and may even detect physical edges and breaks in the uniform surface scanned.

The new system startup and testing process 128 functions as a monitoring system to ensure that each process is running as expected and also manages the thread and thread cycles of the data processor 102. Thread cycle times are controlled via requests from sensor processes and the scanning application itself.

The system processing 130 manages all of the threads operating within the system and assigns priority value to each thread. The system processing 130 also manage tasks which are not threaded but which require access to data or system storage. This process determines which tasks are assigned resources from the data processor 102 or graphics processing unit (GPU) 142, and may generate report data related to the various functions and thread cycles assigned. It is contemplated that the minimum specifications for the system processing 130 are a dual-core NVIDIA Denver2 and a quad-core ARM Cortex-A57, a 256-core Pascal GPU, an 8 gigabyte (GB)LPDDR4, 128-bit interface random access memory (RAM), and 32 GB eMMC.

Figure 4:
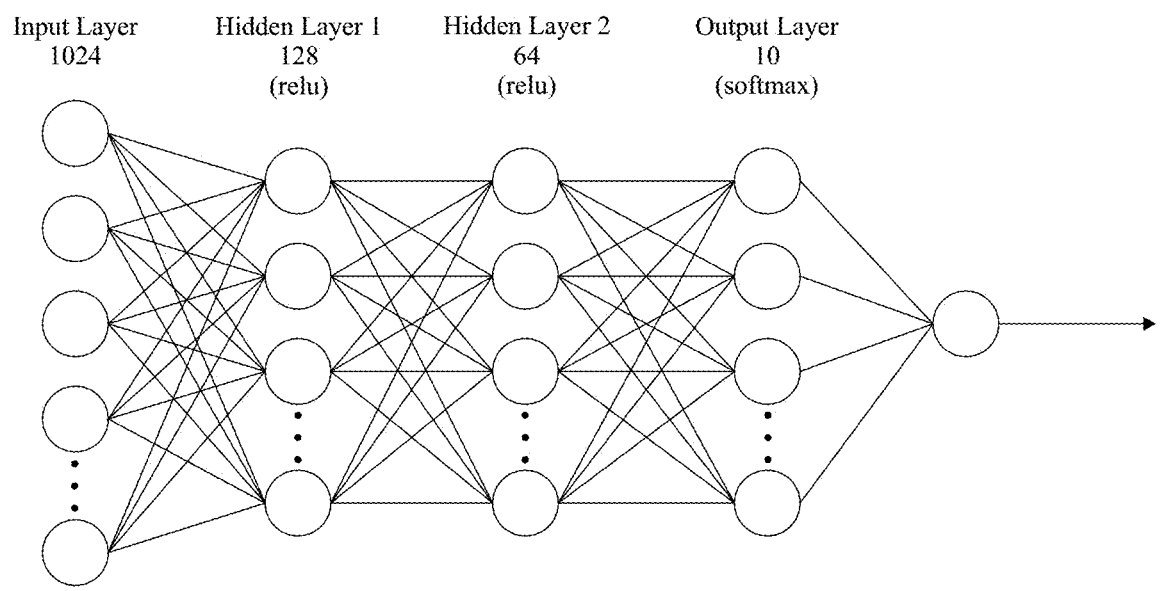
FIG. 4 schematically presents a neural network of an algorithm to identify damage types.

The color classification process 132 uses images of the scanned roof material and compares them against model training on a dataset using similar subject matter. Such training can be performed on previously-saved data in the form of images, video, or numerical values. As schematically illustrated FIG. 4, the neural network of the system may be defined as a 15-layer network comprising 14 convolution layers, 14 rectified linear units (ReLU) layers, 14 batch normalization layers, 4 pooling layers, and 1 linear layer, for a total of 62 layers. An unknown color that cannot be classified by the system may be manually selected and identified by the user. Manually selected and identified colors may then be stored on the central database for addition to the system by an administrator and reference by the system later on. This process allows the system to be constantly updated as new colors, materials, and technologies are implemented.

The damage classification process 134 uses images of the scanned roof material combined with model training on a dataset related to the subject matter to identify and mark damage within the scanned area. Unknown damage that cannot be classified by the system can be manually selected and identified by the user. Manually selected and identified damage may then be stored on the central database for addition to the system by an administrator and reference by the system later on. This process allows the system to be constantly updated as new roofing materials are implemented.

The granular loss process 136 determines which type of damage has occurred by classifying any markers identified as areas of interest. Such classifications may include blister, rash, aged, foot traffic, hail damage, mechanical damage, embedded granulars, normal wear, or any other appropriate classification. A neural turing machine (NTM) may be used as an additional method of calculating granular loss or granular embedding by providing additional data to support the probabilities of finding damage and rechecking images to verify such findings. A per-inch loss rate is calculated in each classification area and compared to an average per-inch value measure from multiple locations of the scanned area, and an output value from 0 to 1 may be calculated based on this comparison.

The artificial intelligence network and tensor defines process 138 requires images to be normalized prior to processing. The process may define its own means values and standard deviation values, and then process the images that are sent to it for analysis. These parameters are then used to set up the network used to classify the images, and the dataset selected will depend on which process calls the artificial intelligence network and tensor defines process 138. The required comparison model is loaded along with the network layers and required parameters for analysis. The artificial intelligence network and tensor defines process 138 may also load random test images that have known values and results for use as a control to validate the assessment results.

The artificial intelligence neural networks process 140 processes images in the order they are scanned, focusing on markers identifying areas of interest. The images are compared against the pre-loaded images to provide an assessment rank probability based on damage type, color, and granular loss. The assessment rank probability may then be added to the overall data collection along with zone identifiers, classification probabilities, and classification name.

The roof material health and statistical data process 144 generates additional roofing material data based on granular loss and detected damage. Anomalies noted here include areas of interest that cannot be classified, areas that require visual inspection, material exposures, or mismatching roof shingles. Such data may then be added to the overall data collection for final reporting.

The roof report data process 146 is organized using zone identifiers including images of all damage found. Items listed may include general roof conditions, pitch, color, shingle type, shingle quality, longitude and latitude of the inspection area, quantity of hail impacts within the inspection area, quantity of mechanical damage within the inspection area, or any other appropriate results.

The system management connection 148 is the primary connection to remove data from the central database, update system applications, upload new datasets, and download system or software updates. The system management connection 148 may be any type of wireless or wired connection, including Bluetooth, WI-Fi, or internet connectivity, and may provide access for system charging and battery monitoring that can be displayed via the user interface 150 or transmitted to a remote location. Such displaying may occur live and in real-time, or may be recorded for later playback.

It is to be understood that the methods and systems mentioned above with respect to "images" also apply to the three-dimensional models described below. For example, instead of an algorithm comparing colors and shades, the algorithm could compare 2D or 3D distances in a three dimensional model generated via a scanner. Furthermore, instead of LIDAR or other imaging techniques like FLIR, blue light may be used as described below. It is to be understood that the specific devices and methods shown in the figures are merely examples and are not intended to limit the spirit and scope of this disclosure.

Figure 5:
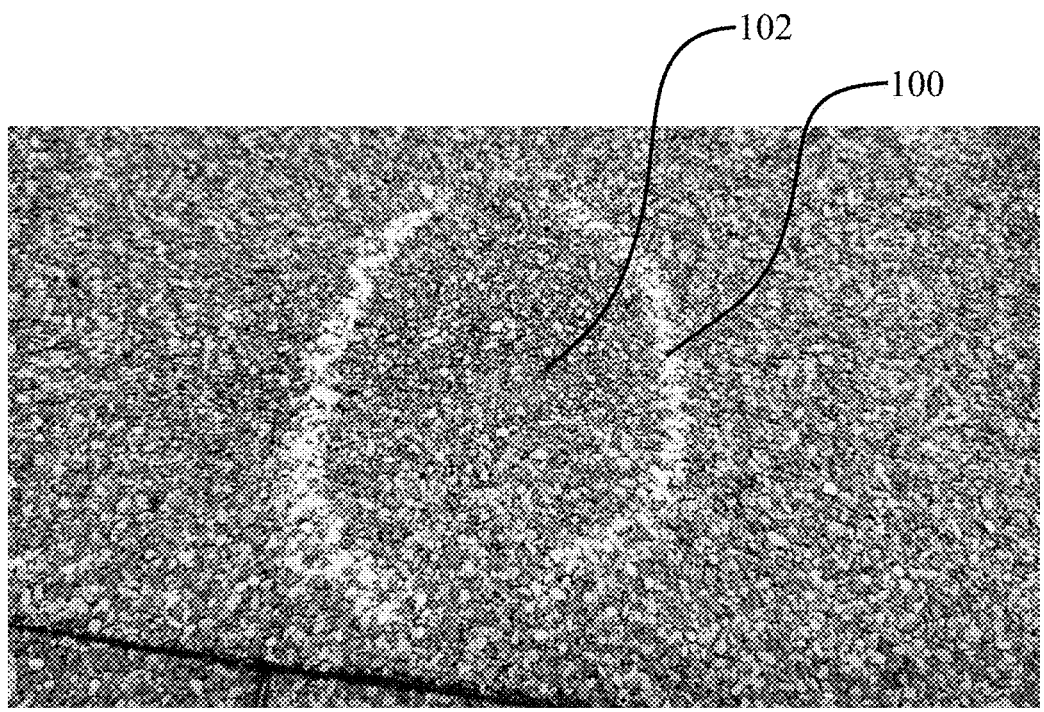
FIG. 5 is a photograph of a target surface and a chalk outline, in accordance with aspects of the present disclosure.
Figure 6:
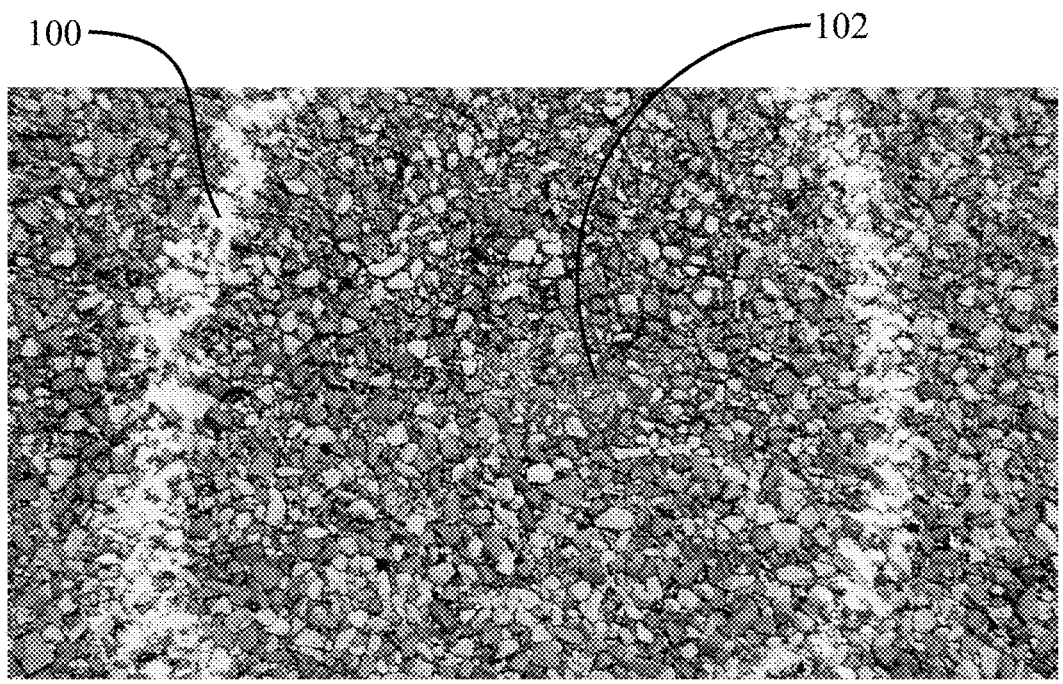
FIG. 6 is a zoomed in area of the photograph of FIG. 5, in accordance with aspects of the present disclosure.

Disclosed in FIGS. 5-17 is an exemplary method and output for modeling and analyzing an impacted surface. More particularly, FIG. 5 shows a test area having been highlighted via labeling chalk 500. A tested surface 502 could be an asphalt shingle, for example. FIG. 6 shows a close up of the arrangement of FIG. 5.

Figure 7:
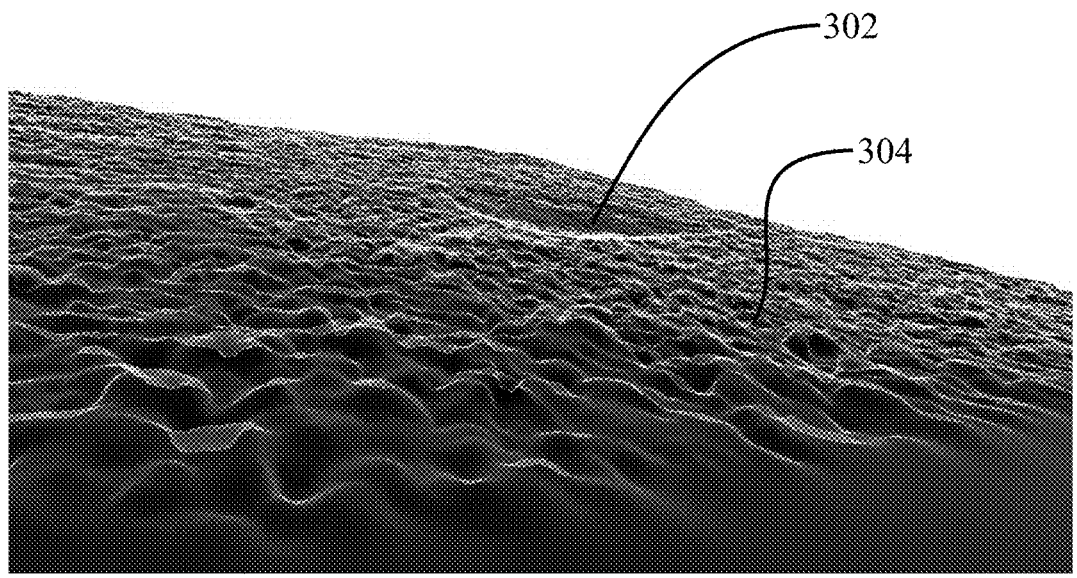
FIG. 7 is a three-dimensional model of the target surface of FIG. 5, in accordance with aspects of the present disclosure

Turning to FIG. 7, shown is a three dimensional model of an impact 702 and a vicinity of the impact 704. 704 is a three dimensional representation of the surface 502 of FIG. 5.

Figure 8:
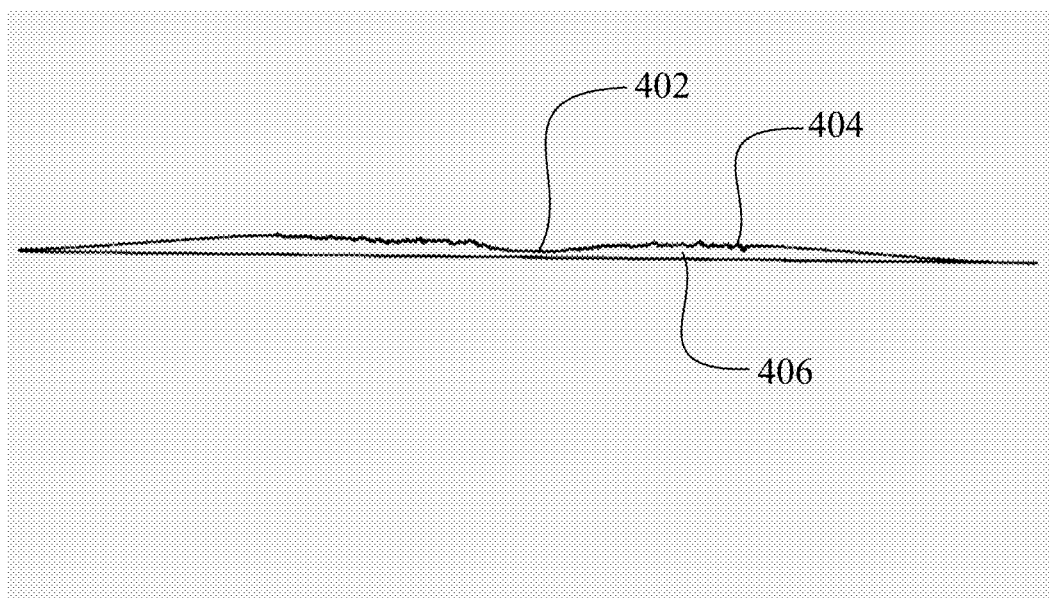
FIG. 8 shows a cross sectional view of a surface contour determined via a 3D model, in accordance with aspects of the present disclosure.

Turning to FIG. 8, shown is a cross sectional view of the three dimensional model, which could be considered a two dimensional representation. FIG. 8 shows an impact 802 of a surface 804. 806 represents a straight line (from a two dimensional perspective) or a plane (from a three dimensional perspective). Such a plane extends perpendicular to the page (e.g. normal to the page).

Figure 9:
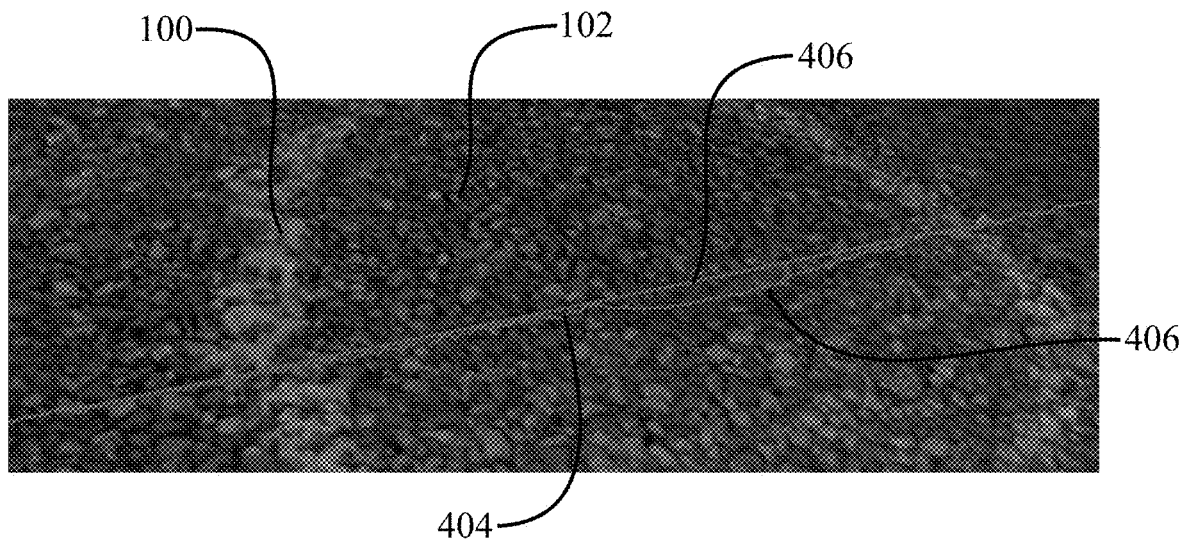
FIG. 9 is a combined 3D model and photograph, showing a surface contour of the 3D model, in accordance with aspects of the present disclosure.

The illustration of FIG. 9 shows the image of FIG. 5 overlaid onto the model of FIG. 8, in three dimensions. As shown, the actual impact represented by 802 is not detectable via the image of FIG. 5 but is clearly visible and identifiable via the model of FIG. 8. The horizontal line 806 assists the viewer in identifying the impact 802 in relation to the rendering of the surface vicinity 804. For example, the impact 802 is clearly visible as a dip (trough) below the horizontal line 806 (the dip is between two peaks). As such, the horizontal line 806 is configured to extend along the surface rendering 804 such that the horizontal line covers a plurality of peaks of the surface 804 to highlight troughs below the horizontal line 806.

Figure 10:
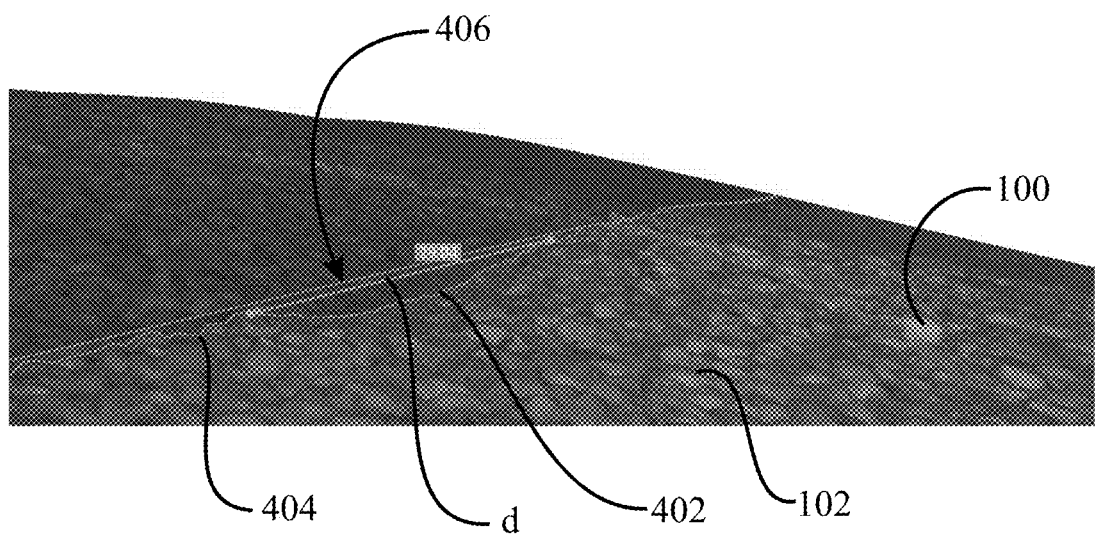
FIG. 10 shows an alternative 3D model-photo combination, where a measurement of an impact is displayed, in accordance with aspects of the present disclosure.

The illustration of FIG. 10 shows a width "d" measurement of the impact crater 802, which in this instance is measured to be 29.04 units. Such units may be any appropriate unit suitable for detecting hail damage.

Figure 11:
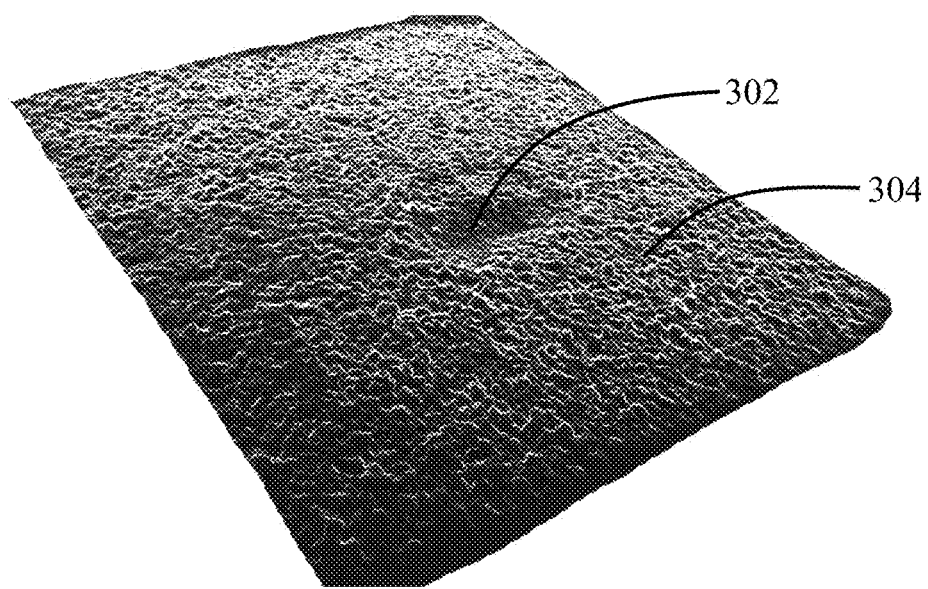
FIG. 11 shows another 3D model of a surface and an impact, in accordance with aspects of the present disclosure.
Figure 12:
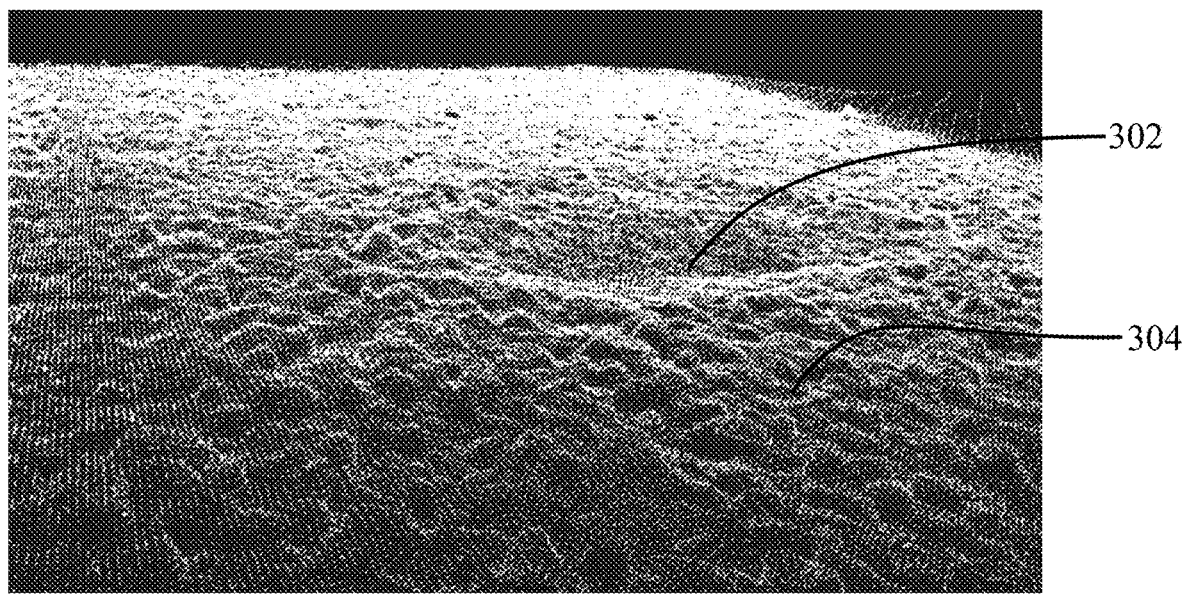
FIG. 12 shows an alternative view of the 3D model of FIG. 11, in accordance with aspects of the present disclosure.

The illustrations of FIGS. 11 and 12 show another example of a three dimensional rendering of the impact 702 and surface 704. In this instance a wireframe or point cloud is visible to show the impact in high resolution.

Figure 13:
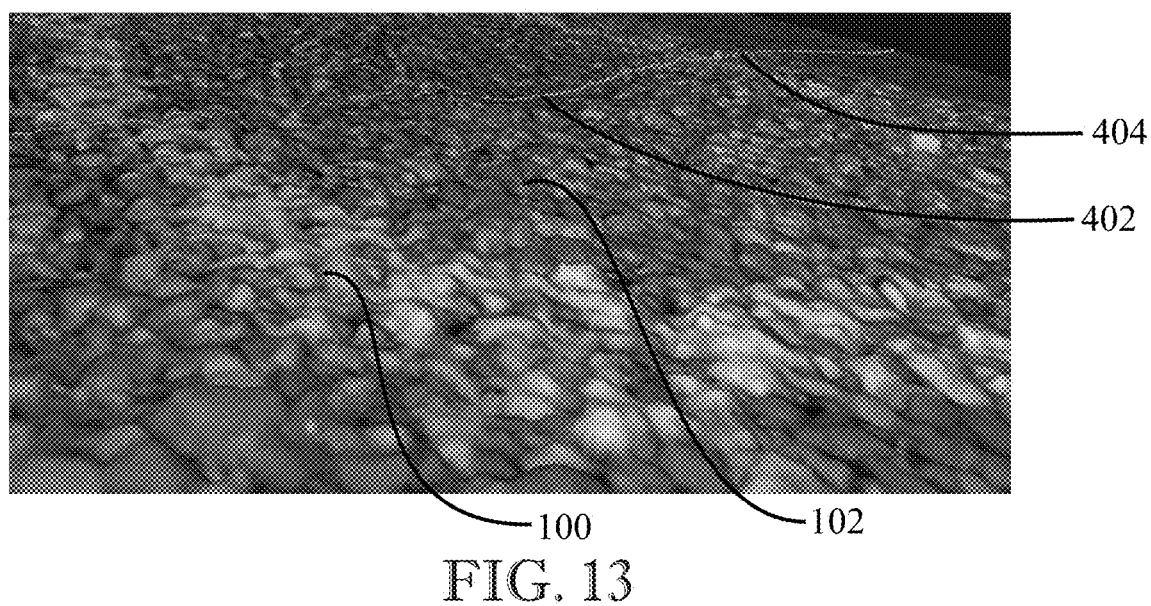
FIG. 13 shows a combination of a 3D model, photograph, and contour line of the 3D model, in accordance with aspects of the present disclosure.

The illustration of FIG. 13 shows another example of the image of FIG. 5 overlaid over the surface rendering line 804 of FIG. 8. Although this disclosure mentions that the image is overlaid over the surface rendering, it is to be understood that the surface rendering or any of its derivatives may be overlaid over the image without departing from the spirit and scope of this disclosure.

Figure 14:
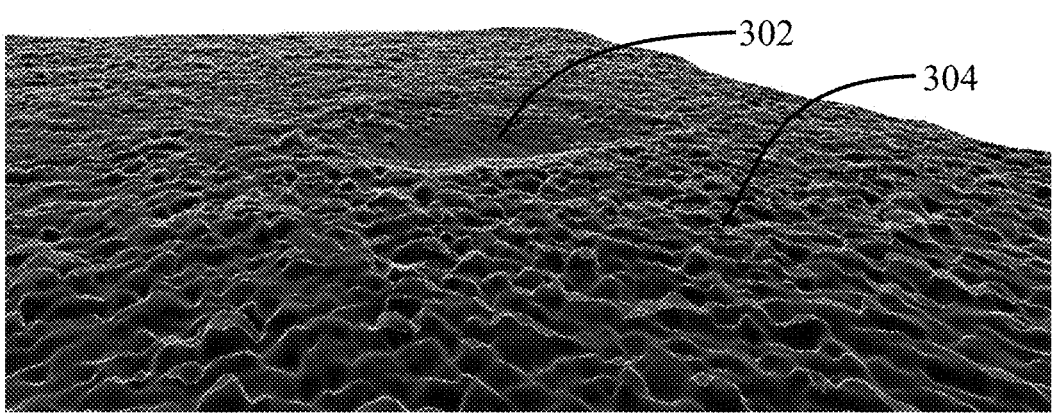
FIG. 14 shows another example of a 3D model, in accordance with aspects of the present disclosure.

The illustration of FIG. 14 shows yet another example of a three dimensional rendering of the surface 704 and impact 702.

Figure 15:
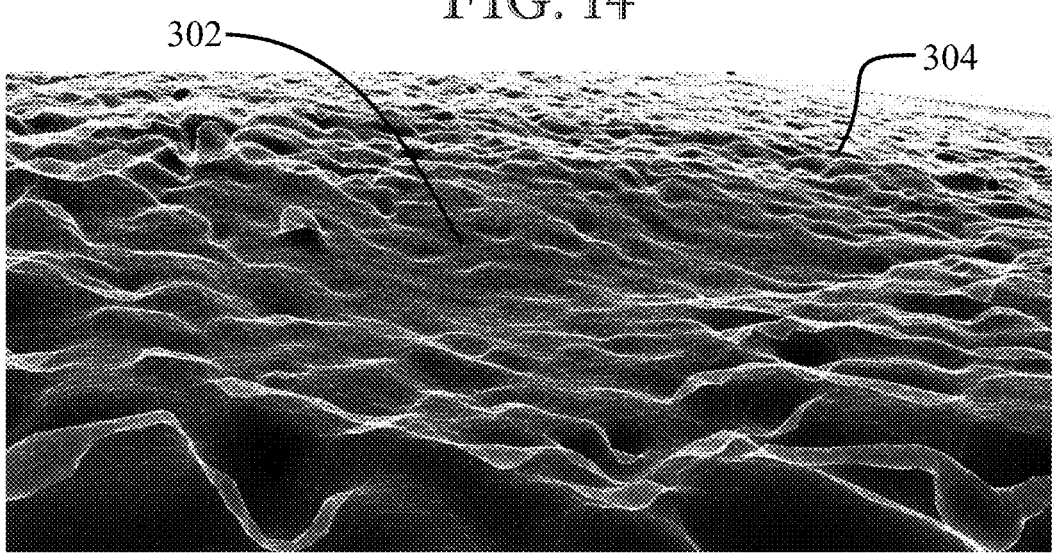
FIG. 15 shows another example of a 3D model with a wireframe displayed, in accordance with aspects of the present disclosure.

The illustration of FIG. 15 shows a close-up of another example of a three dimensional rendering of the surface 704 and impact 702, where a wireframe is clearly visible to assist in analyzing and determining the characteristics of the impact 702.

The invention will now be described in alternative language to provide further illustration.

The purpose of the invention is to provide a scan tool and system to three-dimensionally scan and photograph alleged hail damage to roofing (e.g. asphalt shingles), allowing a user or artificial intelligence algorithm to decipher what type of damage or imperfection is present.

The system can work in direct sunlight, for example by using blue light technology. Blue light is advantageous over other wavelengths of light, such as red, because sunlight has little to no effect on blue light scans. Using blue light ensures that sunlight does not substantially interfere with the scan. It is to be understood that "substantially interfering with the scan" means that the scan is not affected so much that the scan is not usable to perform the methods and tasks described herein. The invention provides scientific and forensic data driven reports that are extremely evident and that requires no human opinion to discern what type of damage is actually present, or if the damage is even present at all. For example, the system could automatically determine if the damage is from hail from foot traffic or other tools.

The AI algorithm could compare the image and/or data to a library of previously classified damage, to correctly match the data with the library to determine the type of damage present.

The scanner could be a handheld scanner, and have a scanning speed of around 7.5 fps, have high 3D point accuracy of 0.05 mm, have a 1.3 Mpx texture resolution, a 3D resolution of 0.1 mm, have full color scanning, have hybrid geometry and color based target free tracking, and have a 3D reconstruction rate of 8 FPS, as a non-limiting example. The scanner takes real photographic images that are overlaid onto a point cloud scan, and by using blue light technology, sunlight does not affect the scan. Hail damage is extremely small and can detect impacts from hail which could be on the order of 5 mm in width. The 3D accuracy could be 0.03% over 100 cm, could have a working distance of 0.2 to 0.3 m, and a working range at closest view at 90 mm×70 mm.

The 3D scan and overlaid photographs provide a viewer with a depth map or depth view that a standard camera cannot produce, since it overlays dimensions of a 3D modeled surface of a target area over the top of the image. By analyzing the shape of the 3D model, either a user or an algorithm can determine the type of damage observed in the 3D data. The data can be transferred to third parties for analysis and verification of the outcomes.

The 3D data (e.g. the overlaid 3D data on the image) can be sent to an artificial intelligence database to receive an output and confirmation of what type of damage is observed. This determination could be automatic based on a library of confirmed benchmarks of damage types. This could include automatic verification of true hail impact marks, foot traffic, tool marks, mechanical deformities and damage, and various other categories. The algorithm can distinguish between these damage types automatically.

It is anticipated that the damage report could include weather data to determine a direction of a storm path (usually from south west) to add additional verification to the determination of a damage type. For example, knowing the direction of incoming hail, the system could determine if the impact model is congruent with the incoming hail, knowing how hail velocity vectors can affect an impact site. For example, incoming hail from the southwest could create an impact that has a trough that is slightly deformed or offset toward the north east, and if the impact has a trough that is deformed toward the southwest, this impact would be classified as not having been caused by hail.

The system or method can automatically or manually execute a 3D scan on soft metals on a roof, measure thickness of metal, decipher metal material, and execute a rockwell test on the metal. For example, testing data gathered via dropping objects (e.g. a steel ball) onto sheet metal can calculate size, direction, and density of hail that impacted the house. This is an additional way to add reliability to damage type conclusions. Such dents in the metal can be compared with impacts on shingles, for example.

One or more 10'×10' test squares can be set up, each facing east, west, north, and south on the roof. Damage targets can be highlighted within the 10×10 test area(s) using chalk, and then all targets may be scanned using the scanner. The data may be uploaded to a home server to create a report of the findings.

It is to be understood that this method and system can be applied to any material that is subject to damage from hail, such as metal siding, gutters, wood shake/shingles, slate roofs, tile roofs, and any low slope roofs including EPDM, TPO, PVC, mod bit, etc.

Laser technology could be included in the system and method. For example, white light imaging in conjunction with a laser scan could also be useful in generating an accurate 3D model that is suitable for an algorithm or human to analyze for damage.

It is to be understood that the disclosure is directed to a method of defect determination and identification, providing the capability of measuring and correctly classifying damage. This classification allows an entity to examine in great detail a defect location by creating the 3D model of the damage. A 3D model has an advantage over existing methods because not only will the model allow a user or algo be able to conduct more precise measurements, but the 3D model can be rotated, zoomed into, and viewed from different angles and cross sections. Furthermore, the 3D models and any output data can be easily shared with other entities and 3rd parties, which is an advantage over the simple use of 2D images (which are subject to bias).

Figure 16:
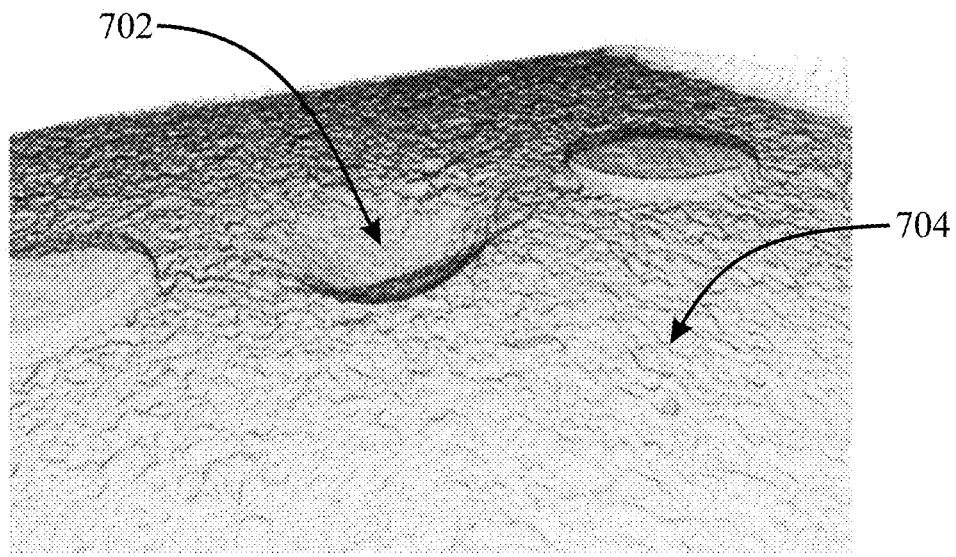
FIG. 16 shows a 3D model of an impact and a reference object in a vicinity of the impact, in accordance with aspects of the present disclosure.
Figure 17:
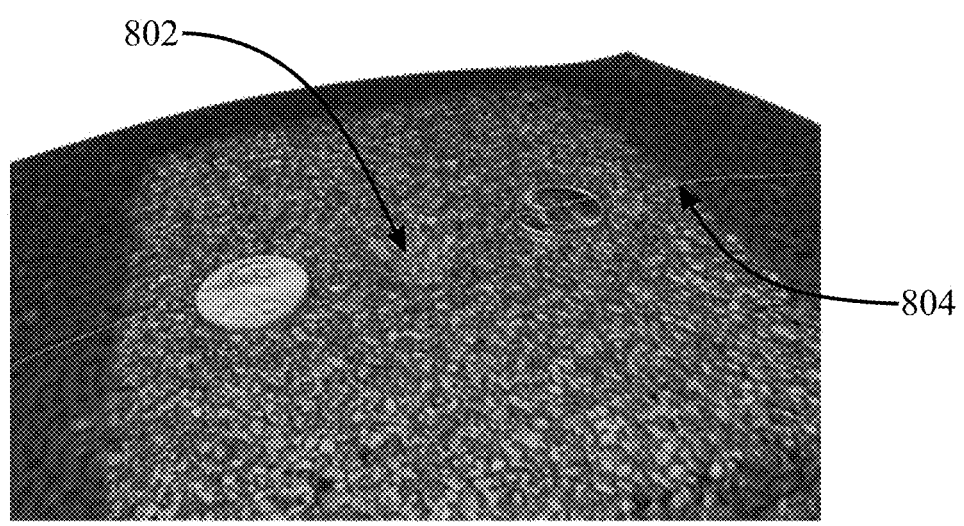
FIG. 17 shows the 3D model of FIG. 16 combined with a photograph texture, and a surface contour line of the 3D model, in accordance with aspects of the present disclosure.

The scanning device could use both blue light and white light to create the accurate 3D images. For example, blue LEDs may be used to create a 3D point cloud (FIG. 16). Blue light scanners provide a higher resolution when compared to lasers because the point cloud spacing is more dense when compared to a laser only system. The white light is used for standard camera imaging which takes photographs during the blue light scanning process. The system as a whole creates a point mesh or "point cloud" and then lays the 2D photograph over the point cloud to create the 3D image with color. As shown in FIG. 17, the overlay is visible over the point cloud.

As such, the blue light scanner uses wavelengths between 450-490 nm, and the white light has a range of 400-700 nm. However, it is to be understood that these ranges can vary and the spirit and scope of this disclosure is not to be limited to these ranges exactly. For example, any appropriate wavelength range can be used for the blue light scanner that does not allow sunlight to affect the scans. And likewise, any wavelengths can be used for the white light to take a high quality photograph.

Below is a list of scanner specifications in table format:

| Scanner Specifications: | |
| --- | --- |
| Scanner type | Handheld |
| 3D point accuracy, up to | 0.05 mm |
| 3D resolution, up to | 0.01 mm |
| | 0.1 mm |
| | 0.029 mm |
| 3D accuracy over distance, up to | |
| | 0.03% over 100 cm |
| | . . . |
| Working distance | |
| | 0.2-0.3 m |
| | . . . |
| Volume capture zone | |
| | 2,000 cm$^3$ |
| | 324 cm$^3$ |
| Linear field of view, H × W @ closest range | |
| | 90 × 70 mm |
| | . . . |
| Linear field of view, H/W @ furthest range | |
| | 180/140 mm |
| | . . . |

-continued

| Scanner Specifications: | |
|---|---|
| Angular field of view, H/W | 30 × 21° |
| Ability to capture texture | Yes |
|  | Yes |
| Texture resolution | |
|  | 1.3 mp |
|  | 6.4 mp |
| Colors | |
|  | 24 bpp |
|  | 24 bpp |
|  | 7.5 fps |
| 3D reconstruction rate for 3D video recording, up to | ... |
|  | 7.5 fps |
| Data acquisition speed, up to | ... |
|  | 1 mln points/sec. |
|  | 1 mln points/sec. |
| 3D exposure time | |
|  | 0.0002 s |
|  | Customizable |
| 2D exposure time | |
|  | 0.0002 s |
|  | Customizable |
| 3D light source | |
|  | Blue LED |
|  | Blue LED |
| 2D light source | |
|  | White 6 LED array |

Figure 3:
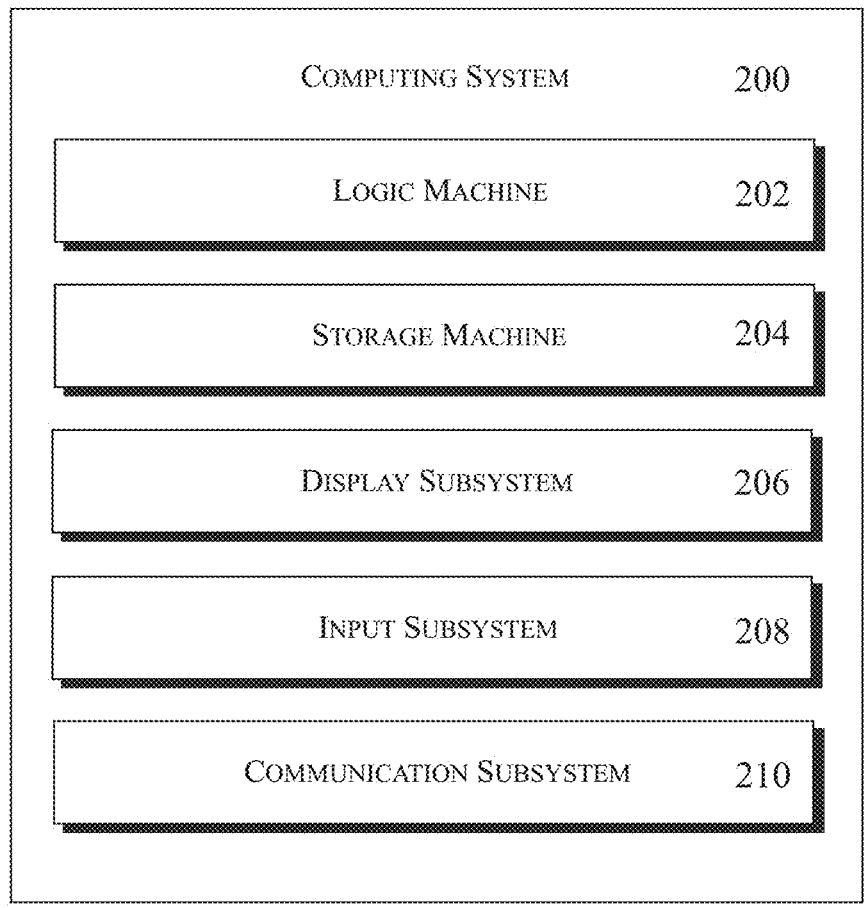
FIG. 3 schematically presents a computing system configured to carry out and actualize methods and tasks described herein, in accordance with aspects of the present disclosure.

In some embodiments the methods, tasks, processes, and/or operations described herein may be automatically effected, executed, actualized, and/or carried out by a computing system including a tangible computer-readable storage medium, also described herein as a storage machine, that holds machine-readable instructions executable by a logic machine (i.e. a processor or programmable control device) to effect, execute, actualize, carry out, provide, implement, perform, and/or enact the above described methods, processes, operations, and/or tasks. For example, a suitable computing system may be computing system 200 shown in FIG. 3. When such methods, operations, and/or processes are implemented, the state of the storage machine 204 may be changed to hold different data. For example, the storage machine 204 may include memory devices such as various hard disk drives, CD, or DVD devices. The logic machine 202 may execute machine-readable instructions via one or more physical information and/or logic processing devices. For example, the logic machine 202 may be configured to execute instructions to perform tasks for a computer program. The logic machine 202 may include one or more processors to execute the machine-readable instructions. The computing system 200 may include a display subsystem 206 to display a graphical user interface (GUI) or any visual element of the methods or processes described above. For example, the display subsystem 206, storage machine 204, and logic machine 202 may be integrated such that the above method may be executed while visual elements of the disclosed system and/or method are displayed on a display screen for user consumption. The computing system 200 may include an input subsystem 208 that receives user input. The input subsystem 208 may be configured to connect to and receive input from devices such as a mouse, keyboard or gaming controller. For example, a user input may indicate a request that a certain task is to be executed by the computing system 200, such as requesting the computing system 200 to display any of the above described information, or requesting that the user input updates or modifies existing stored information for processing. A communication subsystem 210 may allow the methods described above to be executed or provided over a computer network. For example, the communication subsystem 210 may be configured to enable the computing system 200 to communicate with a plurality of personal computing devices. The communication subsystem 210 may include wired and/or wireless communication devices to facilitate networked communication. The described methods or processes may be executed, provided, or implemented for a user or one or more computing devices via a computer-program product such as via an application programming interface (API).

As a non-limiting example, the disclosure teaches action by a processor to execute a "determining step" that cannot be done mentally, for example by determining any of the disclosed data, informatic values, or states by automatically tracking other data, informatic values, or states. For example, the disclosed systems and methods may automatically determine a second (dependent) state or value by automatically tracking a first (independent) state or value, the second state automatically depending on the first state.

The disclosure includes the practical application of a processor (logic machine), and this practical application may include the receiving of an input through a graphical user interface (GUI) such as a user selection to execute one or more tasks or operations. Such a practical application may include the automatic operation of one or more data- or state-determining tasks in response to such a user selection or user input. The practical application as such may automatically execute any of the herein operations based on automatically determining any of the disclosed values, data, informatics, or states.

It is to be understood that the disclosed systems and methods provide a specific manner of automatically executing or actualizing the disclosed tasks, operations, or methods in a manner that is an improvement over known systems and solutions. In addition to being a practical application of machines, the disclosure includes an inventive concept that is not anticipated or obvious in view of known systems and methods.

Furthermore, the systems and methods disclosed herein are configured to solve technical problems in computing in the field of the disclosure as set forth in the background section, where the problems have attributes that hinder, limit, and/or prevent the features, aspects, or elements disclosed herein from being enabled and/or implemented. Therefore the disclosed technical solutions eliminate or alleviate these problems and positively contribute to the technical abilities of existing computing systems and methods.

As a non-limiting example of such a practical application, embodiments of the invention may include a system, a method, and/or a computer program product. The computer program product may include a computer readable storage medium (or media) having computer readable program instructions thereon for causing a processor to carry out aspects of the invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on one or more standalone computers, partly on one or more standalone computers, as a stand-alone software package, partly on one or more standalone computers and partly on one or more remote computers, partly on one or more standalone computers and partly on one or more distributed computing environments (such as a cloud environment), partly on one or more remote computers and partly on one or more distributed computing environments, entirely on one or more remote computers or servers, or entirely on one or more distributed computing environments. Standalone computers, remote computers, and distributed computing environments may be connected to each other through any type of network or combination of networks, including local area networks (LANs), wide area networks (WANs), through the Internet (for example using an Internet Service Provider), or the connection may be made to external computers. In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the invention.

Aspects of the invention are described herein with reference to schematic flowchart illustrations and/or block diagrams of methods, apparatus (systems), functions, and computer program products according to embodiments of the invention. It will be understood that each block of the flowchart illustrations and/or block diagrams, and combinations of blocks in the flowchart illustrations and/or block diagrams or functions, can be implemented by computer readable program instructions. Functions, including policy functions, are groups of computer readable program instructions grouped together that can be invoked to complete one or more tasks.

These computer readable program instructions may be provided to one or more processors of one or more general purpose computers, special purpose computer, or other programmable data processing apparatus to produce a machine, such that the instructions, which execute via the processors of the one or more computers or other programmable data processing apparatus, create means for implementing the functions/acts specified in the flowchart and/or block diagram block or blocks. These computer readable program instructions may also be stored in one or more computer readable storage mediums that can direct one or more computers, programmable data processing apparatuses, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto one or more computers, other programmable data processing apparatus, or other devices to cause a series of operational steps to be performed on the one or more computers, other programmable apparatuses or other device to produce a computer implemented process, such that the instructions which execute on the computers, other programmable apparatus, or other devices implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A method of identifying surface damage, comprising:
scanning a target surface to produce a three-dimensional point cloud, wherein scanning the target surface comprises employing a blue light scanner to scan the target surface, and wherein the blue light scanner employs light having the wavelength between 450-490 nm;
photographing the target surface to produce a photograph;
capturing thermal imaging data of the target surface to generate a baseline temperature profile and to isolate temperature variations in materials surrounding the target surface;
augmenting the thermal imaging data with the photograph to produce a thermographic photograph;
overlaying the point cloud on the thermographic photograph or overlaying the thermographic photograph on the point cloud to produce a 3D-photo model; and
identifying a damage type based on the 3D-photo model, wherein identifying the damage type comprises:
receiving weather data for the target surface; and
classifying, using artificial intelligence and the weather data, the damage type into one or more of the following classes: blister, rash, aged, foot traffic, hail damage, mechanical damage, embedded granulars, or normal wear, wherein classifying comprises inputting the 3D-photo model and the received weather data to an artificial intelligence model.

2. The method of claim 1, wherein scanning the target surface includes using a light wavelength range, the wavelength range being one such that sunlight does not substantially interfere with the scan.

3. The method of claim 1, wherein photographing the target surface includes using a light wavelength range, the wavelength range being one that produces a color photograph.

4. The method of claim 1, wherein identifying a damage type includes comparing metrics of the point cloud to a library of known metrics of known damage types.

5. The method of claim 1, wherein identifying a damage type includes automatically comparing metrics of the point cloud to a library of known metrics of known damage types using artificial intelligence.

6. The method of claim 1, wherein a cross section of the 3D-photo model is displayed to highlight a dip in the target surface.

7. The method of claim 1, wherein identifying a damage type includes measuring a dimension of a dip in the point cloud.

8. The method of claim 1, wherein identifying a damage type includes determining if surface damage is hail damage.

9. A method of identifying surface damage, comprising:
scanning a target surface to produce a three-dimensional point cloud;
photographing the target surface to produce a photograph;
capturing thermal imaging data of the target surface to generate a baseline temperature profile and to isolate temperature variations in materials surrounding the target surface;
augmenting the thermal imaging data with the photograph to produce a thermographic photograph;
overlaying the point cloud on the thermographic photograph or overlaying the thermographic photograph on the point cloud to produce a 3D-photo model; and
identifying a damage type based on the 3D-photo model, wherein identifying the damage type comprises:
receiving weather data for the target surface; and
classifying, using artificial intelligence and the weather data, the damage type into one or more of the following classes: blister, rash, aged, foot traffic, hail damage, mechanical damage, embedded granulars, or normal wear, wherein classifying comprises inputting the 3D-photo model and the received weather data to an artificial intelligence model, and
wherein scanning the target surface includes using a blue light wavelength range between 450-490 nm, the wavelength range being one such that sunlight does not substantially interfere with the scan.

10. The method of claim 9, wherein photographing the target surface includes using a light wavelength range, the wavelength range being one that produces a color photograph.

11. The method of claim 9, wherein identifying a damage type includes comparing metrics of the point cloud to a library of known metrics of known damage types.

12. The method of claim 9, wherein identifying a damage type includes automatically comparing metrics of the point cloud to a library of known metrics of known damage types using artificial intelligence.

13. The method of claim 9, wherein a cross section of the 3D-photo model is displayed to highlight a dip in the target surface.

14. The method of claim 9, wherein identifying a damage type includes measuring a dimension of a dip in the point cloud.

15. The method of claim 9, wherein identifying a damage type includes determining if surface damage is hail damage.

16. A method of identifying surface damage, comprising:
scanning a target surface to produce a three-dimensional point cloud, wherein scanning the target surface comprises employing a blue light scanner to scan the target surface, and wherein the blue light scanner employs light having the wavelength between 450-490 nm;
photographing the target surface to produce a photograph;
capturing thermal imaging data of the target surface to generate a baseline temperature profile and to isolate temperature variations in materials surrounding the target surface;
augmenting the thermal imaging data with the photograph to produce a thermographic photograph;
overlaying the point cloud on the thermographic photograph or overlaying the thermographic photograph on the point cloud to produce a 3D-photo model; and
identifying a damage type based on the 3D-photo model, wherein identifying the damage type comprises:
receiving weather data for the target surface; and
classifying, using artificial intelligence and the weather data, the damage type into one or more of the following classes: blister, rash, aged, foot traffic, hail damage, mechanical damage, embedded granulars, or normal wear, wherein classifying comprises inputting the 3D-photo model and the received weather data to an artificial intelligence model, and
wherein identifying a damage type includes comparing metrics of the point cloud to a library of known metrics of known damage types.

17. The method of claim 16, wherein identifying a damage type includes automatically comparing metrics of the point cloud to a library of known metrics of known damage types using artificial intelligence.

18. The method of claim 16, wherein a cross section of the 3D-photo model is displayed to highlight a dip in the target surface.

19. The method of claim 16, wherein identifying a damage type includes measuring a dimension of a dip in the point cloud.

20. The method of claim 16, wherein identifying a damage type includes determining if surface damage is hail damage.

* * * * *